Patented July 16, 1940

2,208,333

UNITED STATES PATENT OFFICE 2,208,333

ACCELERATOR OF VULCANIZATION

Winfield Scott, Akron, Ohio, assignor to Wingfoot Corporation, Wilmington, Del., a corporation of Delaware No Drawing. Application September 3, 1936, Serial No. 99,239

23 Claims. (Cl. 260—784)

This invention relates to new accelerators of rubber vulcanization. It includes the process of vulcanizing rubber in their presence and the rubber so treated. The new accelerators are selenazyl 2-sulphide compounds and contain the grouping

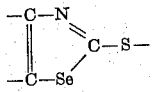

The mercaptothiazoles and derivatives thereof are known to be accelerators of vulcanization. Mercaptobenzothiazole and dibenzothiazyl disulphide are two well known members of a class which have been used extensively. It is also known that 2-mercaptobenzoxazole has but little value as an accelerator of vulcanization (Sebrell & Boord, J. Ind. Eng. Chem, 15, 1014). The amine and guanidine salts of 2-mercaptobenzoxazole are accelerators (Teppema U. S. Patent 1,792,780), but they are very much less active than the corresponding salts of 2-mercaptobenzothiazole. Heretofore it has been considered that in accelerators of the heterazole type, it is necessary that sulphur be one of the constituents of the heterocyclic ring to obtain a satisfactory accelerating effect.

This invention involves the discovery that selenazyl 2-sulphide compounds are excellent accelerators for the vulcanization of rubber. It has been found that they, surprisingly, are more active accelerators than the corresponding 2-mercaptothiazoles.

Illustrative of the compounds of the invention is the following formula

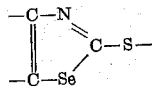

Attached to the open bonds of the adjacent carbon atoms of the selenazole ring may be hydrogen or aliphatic or aromatic radicals. Preferably however, these two adjacent carbon atoms form part of an arylene radical, such as phenylene, nitro phenylene and naphthylene radicals. Attached to the open bond of the sulphur may be hydrogen or any organic or inorganic radical, such as salt- or ester-forming radicals. These compounds are such that by hydrolysis, double decomposition, rearrangement, or by the application of heat, they are capable of forming the free mercaptan compound or its disulfide.

Illustrative of such compounds are the 2-mercapto selenazoles, such as 2-mercapto benzoselenazole; the diselenazyl sulphides, such as di-(benzoselenazyl) disulphide and di(benzoselenazyl) mono sulphide; the metal salts of the 2-mercapto selenazoles, such as the zinc, lead, cadmium, mercury, calcium, sodium, potassium and barium salts of 2-mercapto benzoselenazole; the reaction products of alkali metal salts of the mercapto selenazoles with chlorinated organic compounds, such as the reaction products of sodium benzoselenazyl sulphide with the ortho nitro chlor benzenes, with the aromatic acyl halides, with the furoyl and tetrahydro furoyl halides, with the chlorinated ketones, with the mono and dichlor acetates, with the mono and dichlor acetamides, with chlor benzothiazole, etc. Other illustrative compositions of the invention are the reaction products of 2-mercapto benzoselenazole with formaldehyde, with amines, with the guanidines such as diphenylguanidine and diortho tolyl guanidine, and with aldehyde amines such as ethylidene-aniline, crotonylidene aniline and hexamethylene tetramine, and other reaction products of the mercapto selenazoles with organic materials in which the compositions of the reacton products are unknown. These examples indicate only a few of the compounds of the invention as will be apparent from the following description.

The preparation of the compositions of the invention is illustrated in the following examples. All those with, of course, the exception of the 2-mercapto selenazoles may be prepared by reacting the mercapto selenazole or soluble salt thereof with the desired ingredient or ingredients, the processes being similar to those involved in preparing the corresponding derivatives of the 2-mercaptothiazoles.

Illustrative but not limitative of the invention are the following examples:

Example 1

2-mercapto benzoselenazole is conveniently prepared as follows: Twenty-five grams of sodium hydroxide are dissolved in one liter of water and the solution is then saturated with hydrogen selenide. To this is added 0.5 mol of ortho nitro chlor benzene and the mixture brought to boiling with rapid agitation. One mol of sodium hydroxide is added and hydrogen sulphide gas is passed into the mixture. The mixture is then cooled down to a temperature of about 40° C., whereupon 90 cc. of carbon bisulphide are added. The temperature thereafter is gradually raised so that the carbon bisulphide refluxes. After a few hours the mixture is cooled and the resulting sodium benzoselenazyl mercaptide is treated in solution with an acid such as hydrochloric acid or sulphuric acid, whereupon 2-mercapto benzoselenazole precipitates. The product melts at 160–161° C. and is obtained in the form of a yellow powder. The equations believed to substantially represent the reaction are as follows:

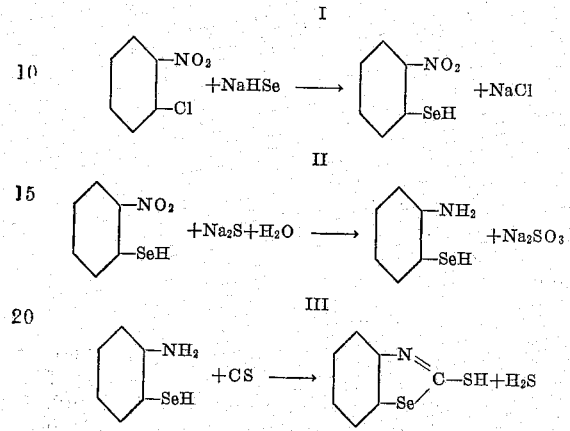

By replacing the ortho nitro chlor benzene of the example with other ortho nitro chlor benzene compounds, such as ortho nitro chlor para toluene, ortho nitro chlor para methoxy benzene, 2-4-dinitro chlor benzene, ortho nitro chlor diphenyl, alpha chlor beta nitro naphthalene, etc., the corresponding 2-mercapto arylene selenazoles may be prepared. These 2-mercapto selenozoles may also be prepared as described in the Journal for the Society of Chemical Industry (1935), page 1765.

*Example 2*

Di(benzoselenazyl) disulphide is readily prepared by subjecting 2-mercapto benzoselenazole to the action of oxidizing agents such as iodine, hydrogen peroxide, ammonium persulphate, etc. Thus, if an alcohol solution of iodine is added to a solution of 2-mercapto benzoselenazole in alcohol, the disulphide, being quite insoluble in the solvent, precipitates. It can also be conveniently prepared by treating an aqueous solution of sodium benzoselenazyl sulphide with an aqueous solution containing hydrogen peroxide and sulphuric acid. Di(benzoselenazyl) disulphide is a yellow crystalline powder melting at 208–209° C. Other di(arylthiazyl) diselenides may be prepared similarly by oxidizing the desired mercapto selenazole, examples being di(5-nitro benzoselenazyl) disulphide, di(5-methyl benzoselenazyl) disulphide, di(7-phenyl benzoselenazyl) disulphide, and di(5-ethoxy benzoselenazyl) disulphide.

*Example 3*

Bivalent metal and other metal salts of the 2-mercapto selenazoles other than the alkali metal salts are conveniently prepared by adding a solution of a soluble salt of the desired metal to an aqueous solution of an alkali metal salt of the 2-mercapto selenazole. Thus, the zinc salt of 2-mercapto benzoselenazole is prepared by dissolving 21 grams of 2-mercapto benzoselenazole in 200 cc. of an aqueous solution of caustic soda containing 4.0 grams of sodium hydroxide. To this are added with stirring, 100 cc. of an aqueous solution containing an excess of zinc chloride. The zinc benzoselenazyl 2-sulphide precipitates at once and after filtering, washing and drying is obtained as a light yellow powder melting at about 250° C.

*Example 4*

Lead benzoselenazyl 2-sulphide is prepared similarly by adding a solution of 11.6 grams of lead nitrate in 200 cc. of water to the equivalent amount of an aqueous solution of sodium benzoselenazyl 2-mercaptide. The resulting precipitate is then filtered off, washed with water and air dried. A quantitative yield is obtained. The product is a yellow powder which melts with decomposition at 292–293° C. By analysis it is found to contain 32.06% of lead. The theoretical lead content for lead benzoselenazyl 2-mercaptide is 32.70%.

*Example 5*

Mercuric benzoselenazyl 2-sulphide was prepared similarly by adding an aqueous solution containing 9.5 grams of mercuric chloride to an aqueous solution containing the equivalent amount of sodium benzoselenazyl 2-sulphide. The resulting precipitate was filtered, washed and dried as in the preceding example. A 96% yield of a yellow powder melting at 213–214° C. with decomposition was obtained. By analysis it was found to contain 31.90% of mercury. The theoretical mercury content of mercuric benzoselenazyl 2-sulphide is 32.04%.

*Example 6*

Cadmium benzoselenazyl 2-sulphide was prepared similarly by the use of an aqueous solution of cadmium chloride in place of mercuric chloride in the preceding example. The cadmium salt is a yellow powder which melts at a temperature above 295° C. It was found to contain 20.95 cadmium as compared with the theoretical cadmium content for cadmium benzoselenazyl 2-sulphide of 20.89%.

Other illustrative metal salts are calcium benzoselenazyl 2-sulphide, zinc 4-tolyl selenazyl 2-sulphide, lead 7-ethyl benzoselenazyl 2-sulphide, barium 5-methoxy benzoselenazyl 2-sulphide and zinc beta naphtha selenazyl 2-sulphide.

*Example 7*

The piperidine salt of 2-mercapto benzoselenazole is prepared by suspending 15 grams of 2-mercapto benzoselenazole in 50 cc. of ether and adding thereto with stirring 6 grams of piperidine. The salt, which is insoluble in ether, forms immediately and is filtered off and washed with a small amount of fresh ether after which the ether is evaporated. The piperidinium benzoselenazyl 2-sulphide is obtained in the form of a flesh colored powder melting at 147–148° C. The equation believed to represent the reaction is as follows:

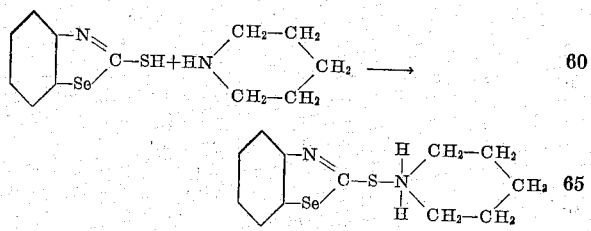

Other amine salts of the mercapto selenazoles may be prepared similarly merely by reacting the desired 2-mercapto selenazole with the desired amine. Illustrative are the cyclohexyl amine, ethylene diamine, diethyl amine, butyl amine, dibutyl amine, tetrahydro alpha furfuryl amine, diamyl amine, N-ethyl cyclohexyl amine, p-phenylene diamine, dibutyl ethylene diamine, di iso propyl amine, and hexahydro phenetidine salts of 2-mercapto benzoselenazole, 2-mercapto 6-ethoxy benzoselenazole, and of other 2-mercapto selenazoles.

Example 8

The diphenylguanidine salt of 2-mercapto benzoselenazole is prepared by dissolving equal molar proportions of the two ingredients in a suitable solvent, such as ethyl alcohol, and allowing the resulting salt to crystallize out. It is obtained in the form of white crystals melting at 173° C.

Other guanidine salts may be prepared similarly, examples being the dixylyl guanidine, triphenyl guanidine and mono phenyl guanidine salts of 2-mercapto benzoselenazole, and the di-ortho tolyl guanidine salts of 2-mercapto 6-nitro benzoselenazole, of 2-mercapto benzoselenazole and of 2-mercapto 4-ethoxy benzoselenazole.

The ammonia reaction products of the 2-mercapto selenazoles are also included in the invention, of which ammonium benzoselenazyl 2-sulphide and ammonium 6-methyl benzoselenazyl 2-sulphide are illustrative. These ammonia, amine and guanidine addition products of the 2-mercapto selenazoles may be further reacted with aldehydes to form compositions of unknown structure which are excellent accelerators. Illustrative are the crotonaldehyde reaction product of the reaction product of 2-mercapto benzoselenazole and hexamethylene tetramine, the acetaldehyde reaction product of butyl ammonium benzoselenazyl 2-sulphide and the formaldehyde reaction product of the ethylene diamine addition product of 2-mercapto benzoselenazole.

Example 9

An excellent accelerating composition whose structure has as yet not been identified is prepared by reacting 2-mercapto benzoselenazole, formaldehyde and urea. Thus, 15 grams of 2-mercapto benzoselenazole, 6 grams of an aqueous solution containing 36% formaldehyde and 8.4 grams of urea were placed in 90 cc. of water. To this mixture 20 cc. of a mixture of equal volumes of water and concentrated hydrochloric acid were added. The mixture was heated on a steam bath for a few minutes after which the reaction mixture was filtered off and washed with water. The product obtained was in the form of a flesh-colored powder melting at 245–246° C. The yield was 82%.

Similar reaction products may be prepared by substituting for the 2-mercapto benzoselenazole other 2-mercapto selenazoles such as 2-mercapto 6-methyl benzoselenazole, 2-mercapto selenazole, 2-mercapto 6-hydroxy benzoselenazole, etc. Also, other proportions of formaldehyde and urea for a given amount of a 2-mercapto selenazole may be employed to produce excellent accelerators.

Example 10

To an aqueous or alcoholic solution of sodium benzoselenazyl 2-sulphide is added a molecular equivalent of 2-4-dinitro chlor benzene and the mixture heated under a reflux condenser until the odor of dinitro chlor benzene disappears. The mixture is then cooled and the resulting 2-4-dinitro phenyl benzoselenazyl 2-sulphide, which precipitates out, is removed by filtration, washed free of sodium chloride and dried. After recrystallization from benzene it is obtained in the form of canary yellow crystals melting at 168–169° C. An analysis for sulphur and selenium showed that it contains 9.00% sulphur and 19.50% selenium as compared with the theoretical sulphur and selenium contents of 8.42% and 20.78%, respectively, for 2-4-dinitro phenyl benzoselenazyl is as follows:

Other nitro phenyl benzoselenazyl 2-sulphides may be prepared by replacing the dinitro chlor benzene with the desired nitro chlor benzene in which a nitro group should be ortho to the chlorine. Illustrative are 2-6-dinitro 4-chlor phenyl benzoselenazyl 2-sulphide, 2-4-6-trinitro phenyl benzoselenazyl 2-sulphide and 2-nitro phenyl benzoselenazyl 2-sulphide.

Example 11

Benzothiazyl benzoselenazyl mono sulphide is prepared by adding 20 grams of anhydrous aluminum chloride to a solution of 23 grams of 2-mercapto benzoselenazole and 17 grams of 2-chlor benzothiazole in 150 cc. carbon bisulphide. A moderate exothermic reaction occurred with the separation of a tan colored aluminum chloride addition compound. The reaction mixture was then refluxed on a steam bath for a period of 90 minutes, cooled and filtered, after which the resulting solid product was decomposed with cold water, filtered and dried in the air. The solid portion was then boiled in ethyl alcohol, filtered and the alcohol insoluble material dried in the air. Upon recrystallizing from benzene, pale yellow crystals melting at 113–114° C. were obtained. An analysis for nitrogen gave 8.42% as compared with the theoretical nitrogen content for benzothiazyl benzoselenazyl mono sulphide of 8.07%. The equation representing the reaction is as follows:

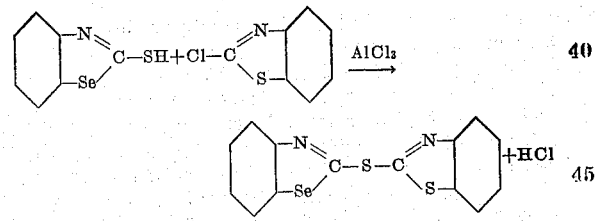

Example 12

Cyclohexyl ammonium benzoselenazyl 2-sulphide is prepared by treating a suspension of 15 grams of 2-mercapto benzoselenazole in 50 cc. of ether with 6.9 grams cyclohexylamine. The resulting salt precipitates at once and is filtered off and washed with fresh ether. A practically quantitative yield of the cyclohexylamine salt of 2-mercapto benzoselenazole is obtained. The compound melts at 137–138° C.

Example 13

Further illustrative of the invention is the class of selenazyl 2-sulphide compounds prepared by reacting at room temperatures, or slightly higher, a 2-mercapto selenazole, formaldehyde and a secondary amine or a primary aromatic amine. In the reaction water is split out, the methylene group of the formaldehyde linking the selenazyl 2-sulphide group and the amino radical to form compounds which may be called amino methylene selenazyl 2-sulphides. In one embodiment of this class, 21.4 grams of 2-mercaptobenzoselenazyl and 8.5 grams of a 36% aqueous formaldehyde solution were added to 50 cc. of ethyl alcohol. To this mixture were added with stirring 8.5 grams of piperidine. After a few minutes a yellow solid crystallized out in a 96% yield. Upon drying, the product melted without further purification at 141–143° C. When crystallized from alcohol the melting point of this solid was 143–144° C. It is believed to possess one of the two formulae:

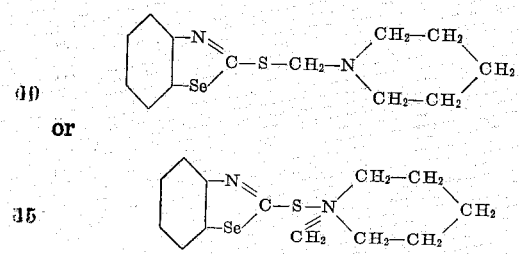

and may be called penta methylene amino methylene benzoselenazyl 2-sulphide.

Similar accelerators may be prepared by replacing the piperidine or the 2-mercapto benzoselenazole with another secondary amine or another 2-mercapto selenazole. Exemplary are di n-butyl amino-, dibenzyl amino-, N-ethyl cyclohexyl amino-, oxy tetra methylene amino-, and phenyl beta naphthylamino methylene benzoselenazyl 2-sulphides.

*Example 14*

Phenyl amino methylene benzoselenazyl 2-sulphide, believed to have the formula

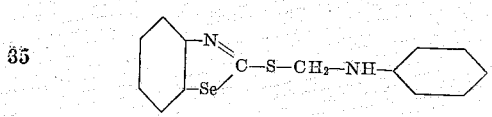

is prepared by adding 4 parts by weight of an aqueous 36% formaldehyde solution to an alcoholic suspension containing 10.7 parts by weight of 2-mercapto benzoselenazole in 20 parts by weight of ethyl alcohol. To this were added with stirring 4.7 parts of aniline. The mixture was then carefully heated to a temperature of 50–60° C. for a period of about 10 minutes, after which it was allowed to stand at room temperature for an hour. The resulting precipitate was filtered and washed with a small amount of alcohol and then crystallized from a benzene petroleum mixture. It was obtained in the form of light yellow crystals melting at 95–96° C.

Corresponding products can be prepared by replacing the aniline with other primary aromatic amines, such as ortho toluidine, para toluidine, the ortho and para phenetidines, and the alpha and beta naphthylamines. Similarly, the nitroso derivatives may be made by adding gaseous ethyl nitrite to a benzene solution of these aryl amino methylene benzoselenazyl 2-sulphides cooled to a temperature of about 10° C.

*Example 15*

21.4 grams of 2-mercapto benzoselenazole were dissolved in 100 cc. of a 5% aqueous sodium hydroxide solution and 14 grams of benzoyl chloride added thereto. The mixture was stirred until the resulting reaction product had become solid. This solid was then crushed and the mixture stirred for a few minutes longer. After filtering and washing with water, the solid was crystallized from a mixture of benzene and petroleum ether, whereupon light yellow crystals melting at 133–134° C. and believed to be benzoyl benzoselenazyl 2-sulphide were obtained. The compound has the formula

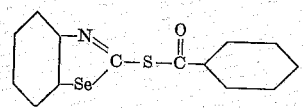

Similar compounds can be prepared by replacing the benzoyl chloride with furoyl chloride or another aromatic acyl halide, such as phthaloyl chloride, p-nitro benzoyl chloride, alpha naphthoyl chloride, etc. Other mercapto selenazoles too may be used.

Many other compounds of the invention may be prepared similarly by replacing, for example, the 2-4-dinitro chlor benzene of Example 10 with the desired halogenated compound. Illustrative are the reaction product of sodium or potassium benzoselenazyl 2-sulphide and mono chlor acetone, and the reaction product of one mol of asymmetrical dichlor acetone and two mols of sodium benzoselenazyl 2-sulphide. In like manner a benzoselenazyl 2-sulphide reaction product of the invention is prepared by reacting in aqueous solution two molar proportions of sodium benzoselenazyl 2-sulphide with one mol of benzal chloride. Dibenzoselenazyl mono sulphide may be prepared similarly by reacting an aqueous solution of sodium benzoselenazyl 2-sulphide and 2-chlor benzoselenazole. Other accelerators of the invention may be prepared by reacting ortho nithrophenyl sulphur halides with sodium benzoselenazyl 2-sulphides in aqueous solution. Illustrative are the reaction product of 2-benzoyl 4-nitrophenyl sulphur bromide and sodium benzoselenazyl 2-sulphide, and the reaction product of 2-nitro phenyl sulphur chloride and sodium benzoselenazyl 2-sulphide.

Further illustrative of the invention are the accelerators prepared by reacting in alcoholic solution sodium selenazyl 2-sulphides and aryl seleno halides, such as the reaction product of o-nitro phenyl seleno chloride and sodium benzoselenazyl 2-sulphide. Still other accelerators of the invention are the reaction products prepared by reacting in alcoholic solution 2-chlor quinoline with, respectively, sodium benzoselenazyl 2-sulphide and sodium 5-nitro benzoselenazyl 2-sulphide.

Other accelerators of the invention are the addition products of amines with zinc selenazyl 2-mercaptides which may be prepared by adding the amine to the zinc selenazyl 2-mercaptide in petroleum ether. Illustrative are the piperidine-, cyclohexyl amine-, benzyl amine-, diamyl amine-, di n-butyl amine-, di isopropyl amine-, hexahydro phenetidine-, hexahydro toluidine-, ethylene diamine-, tetrahydro alpha furfuryl amine-, N-methyl cyclohexyl amine-, N-ethyl tetrahydro alpha furfuryl amine-, amyl amine-, butyl amine-, heptyl amine-, and hexyl amine addition products of zinc benzoselenazyl 2-mercaptide.

Another composition of the invention is that accelerator believed to be a substituted ammonium salt of 2-mercapto benzoselenazole, which is prepared by reacting in aqueous solution equi-molar proportions of sodium benzoselenazyl 2-sulphide and the benzyl chloride addition product of hexamethylene tetramine. Dibenzoselenazyl dithiocarbonate is prepared by reacting in aqueous solution or in benzene solution two molar proportions of sodium benzoselenazyl 2-sulphide and one molar proportion of carbonyl chloride, the reaction preferably being carried out at a temperature below 10° C. The thiophosgene derivatives of the 2-mercapto benzoselenazoles may be prepared similarly.

Quaternary ammonium halides react with alkali metal benzoselenazyl 2-sulphides to form accelerators of the invention. Thus, upon the addition of sodium benzoselenazyl 2-sulphide to a hot benzene solution of hexa decyl pyridinium chloride and refluxing the reaction mixture for several hours, the reaction product of hexa decyl pyridinium chloride and sodium benzoselenazyl 2-sulphide is obtained. By replacing this quaternary ammonium halide with hexa decyl trimethyl ammonium bromide, with benzyl tri methyl ammonium chloride, with benzyl pyridine ammonium chloride, with beta hydroxy ethyl pyridine chloride, the corresponding benzoselenazyl 2-sulphides are obtained.

Other compounds of the invention are the reaction product of N-chloro piperidine with sodium benzoselenazyl 2-sulphide, the reaction product of N-chloro morpholine with sodium benzoselenazyl 2-sulphide, and the corresponding reaction products in which dimethyl chlor amine and dibutyl chlor amine are substituted for the N-chloro piperidine and N-chloro morpholine.

Other reaction products of chlorinated compounds with sodium benzoselenazyl sulphides are the reaction products of mono and dichlor aceto phenone with sodium benzoselenazyl 2-sulphide, the reaction product of diphenyl carbamine chloride with sodium benzoselenazyl 2-sulphide, and the reaction products of imino methylene dichlorides and dichlor di imides with these sulphides. Another accelerator of the invention is the product prepared by reacting acetyl chloride on benzoselenazyl 2-thio methylene hydrin.

Still other illustrative examples of the invention are the reaction products of formaldehyde with the 2-mercapto selenazoles, such as 4-phenyl benzoselenazyl 2-thio methylene hydrin and benzoselenazyl 2-thio methylene hydrin. Still other compositions of the invention are the reaction products of methylol guanidines with the 2-mercapto selenazoles, illustrative of which is the reaction product of 2-mercapto benzoselenazole with the reaction product of diphenyl guanidine and formaldehyde. Other compositions are the reaction products of the 2-mercapto selenazoles with methylol amides. Thus, formaldehyde is reacted with acetamide or benzamide or other amide in molar proportions and the product then mixed with a mol of 2-mercapto benzoselenazole and the product heated until water is split out.

The products of the invention have been found to be excellent accelerators of the vulcanization of rubber, being quite active at relatively low temperatures. Illustrative of two formulae in which the products of the invention have been found satisfactory are as follows:

Formula A

| | Parts by weight |
|---|---|
| Smoked sheet rubber | 100 |
| Zinc oxide | 5 |
| Sulphur | 3 |
| Accelerator | As indicated |

Formula B

| | Parts by weight |
|---|---|
| Smoked sheet rubber | 100 |
| Zinc oxide | 5 |
| Sulphur | 3 |
| Titanium oxide | 10 |
| Diphenylguanidine | 0.15 |
| Accelerator | 0.35 |

Results obtained by the use of these formulae are as follows; the figures given being those for the optimum cure in the range tested as determined by hand tests. Also, tests are included showing the comparative action of the accelerators with three corresponding accelerators of the 2-mercaptothiazole type.

| Accelerator | Amount, parts in weight | Cure in minutes, °F. | Ultimate tensile kgs./cm.² | Maximum elongation, percent | Kg./cm.²@ 500% | Kg./cm.²@ 700% | Formula |
|---|---|---|---|---|---|---|---|
| 2-mercaptobenzoselenazole | 0.50 | 20/260 | 134 | 790 | 21 | 75 | A |
| 2-mercaptobenzothiazole | 0.50 | 40/260 | 130 | 840 | 17 | 57 | A |
| Dibenzothiazyl disulphide | 0.50 | 40/275 | 110 | 800 | 19 | 60 | A |
| Dibenzoselenazyl disulphide | 0.50 | 30/275 | 142 | 800 | 22 | 79 | A |
| Zinc benzothiazyl 2-mercaptide | 0.65 | 60/260 | 125 | 840 | 17 | 53 | A |
| Zinc benzoselenazyl 2-mercaptide | 0.65 | 30/260 | 165 | 800 | 24 | 88 | A |
| Piperidinium benzoselenazyl 2-sulphide | 0.30 | 30/240 | 140 | 790 | 21 | 79 | A |
| Cyclohexyl ammonium benzoselenazyl 2-sulphide | 0.50 | 15/240 | 174 | 770 | 30 | 114 | A |
| Product of Example 9 | 0.35 | 30/260 | 190 | 710 | 50 | 182 | B |
| 2-4-dinitro phenyl benzo selenazyl 2-sulphide | 0.50 | 60/240 | 173 | 770 | 40 | 162 | A |
| Diphenylguanidine | 0.20 | 40/240 | 135 | 860 | 17 | 55 | A |
| Lead benzoselenazyl 2-mercaptide | 0.50 | 40/240 | 130 | 830 | 18 | 62 | A |
| Mercuric benzoselenazyl 2-mercaptide | 0.50 | 40/260 | 106 | 890 | 12 | 36 | A |
| Cadmium benzoselenazyl 2-mercaptide | 0.50 | 30/260 | 138 | 830 | 18 | 60 | A |
| Benzoyl benzoselenazyl 2-sulphide | 0.30 | | | | | | |
| Benzoyl benzoselenazyl 2-sulphide Diphenylguanidine | 0.20 | 15/260 | 157 | 780 | 25 | 97 | A |

It will be observed that the 2-mercapto selenazoles and their derivatives are considerably more powerful accelerators than mercaptobenzothiazole and its corresponding derivatives. They cause the vulcanization of rubber in much shorter times and also provide a stiffer, snappier cure as is shown by the much higher tensile figures at 500% and 700% than those for the corresponding thiazyl sulphide compounds. With some of the selenazyl 2-sulphide compounds it will be found that their use in conjunction with basic nitrogen-containing activating accelerators is very satisfactory; e. g., with the diselenazyl monosulphides and the benzothiazyl benzoselenazyl mono sulphides. Many of the selenazyl 2-sulphide compounds, however, are sufficiently active in and of themselves that activation by a basic compound is neither necessary nor desirable.

It will be understood that, while 2-mercapto benzoselenazole and its derivatives have been used principally in describing the invention, the invention is not limited thereto but includes the class of 2-mercapto selenazoles and derivatives thereof broadly. Illustrative of the 2-mercapto selenazoles are 2-mercapto selenazole, 4-5- dimethyl 2-mercapto selenazole, 4-phenyl 2-mercapto selenazole, 2-mercapto 6-tertiary butyl benzoselenazole, 4-5-di-p-anisyl 2-mercapto selenazole, 4-5-diphenyl 2-mercapto selenazole, 2- mercapto 6-tertiary amyl benzoselenazole, 2-mercapto 5-nitro benzoselenazole, 5-,6- or 7-methyl 2-mercapto benzoselenazole, 2-mercapto 6-oxyphenyl benzoselenazole, 2-mercapto 4-6-dimethyl benzoselenazole, 5-, 6- or 7-methoxy 2-mercapto benzoselenazoles, 2-mercapto 5- or 6-chlor benzoselenazole, 5-, 6- or 7-hydroxy 2-mercapto benzoselenazoles, 2-mercapto 5- or 6-amino benzoselenazole, 2-mercapto AR-tetrahydro alpha naphthaselenazole, 2-mercapto alpha or beta naphthaselenazole, 2-mercapto 6-phenylamino benzoselenazole, etc. Of these the 2-mercapto arylene selenazoles of the benzene and naphthalene series are preferred. Where a sodium salt of a mercapto selenazole has been referred to, it will, of course, be understood that, if desired, other water soluble salts, such as the potassium and ammonium salts may be used instead.

From the foregoing description it will be apparent that an invention of generic scope is provided, the class of selenazyl 2-sulphide compounds having been discovered and having been found excellent accelerators of the vulcanization of rubber. It is to be understood that by the expressions "selenazyl 2-sulphide compounds" and "benzoselenazyl 2-sulphide compounds," it is intended to include compounds and products embodying a selenazyl or benzoselenazyl radical, as the case may be, with a sulphur atom attached to the mu carbon atom of the selenazole ring. While various embodiments of the invention have been described in detail, it will be understood that the invention is not so limited but that numerous modifications may be made therein without departing from the spirit of the invention or from the scope of the appended claims, wherein it is intended to cover all features of patentable novelty residing in the invention.

What I claim is:

1. The process of vulcanizing rubber which comprises subjecting rubber to vulcanization in the presence of an aryl selenazyl 2-sulphide compound.

2. The process of accelerating the vulcanization of rubber which comprises vulcanizing in the presence of a benzoselenazyl 2-sulphide compound.

3. The process of vulcanizing rubber which comprises subjecting rubber to vulcanization in the presence of a composition containing the grouping

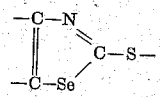

4. The process of vulcanizing rubber which comprises subjecting rubber to vulcanization in the presence of a selenazyl 2-sulphide compound.

5. The process of vulcanizing rubber which comprises subjecting rubber to vulcanization in the presence of 2-mercapto benzoselenazole.

6. The process of vulcanizing rubber which comprises subjecting rubber to vulcanization in the presence of di(benzoselenazyl) disulphide.

7. The process of vulcanizing rubber which comprises subjecting rubber to vulcanization in the presence of zinc benzoselenazyl 2-sulphide.

8. The process of vulcanizing rubber which comprises subjecting rubber to vulcanization in the presence of a bivalent metal salt of 2-mercapto benzoselenazole.

9. The process of vulcanizing rubber which comprises subjecting rubber to vulcanization in the presence of a metal salt of 2-mercapto benzoselenazole.

10. The process of vulcanizing rubber which comprises subjecting rubber to vulcanization in the presence of a 2-mercapto aryl selenazole.

11. The process of vulcanizing rubber which comprises subjecting rubber to vulcanization in the presence of a di(aryl selenazyl) sulphide.

12. The process of vulcanizing rubber which comprises subjecting rubber to vulcanization in the presence of a metal salt of a 2-mercapto aryl selenazole.

13. The process of vulcanizing rubber which comprises subjecting rubber to vulcanization in the presence of a composition containing the grouping

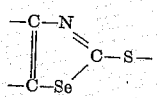

wherein the two adjacent carbon atoms of the selenazole ring are part of an arylene radical.

14. The vulcanizates prepared according to the process of claim 3.

15. The vulcanizates prepared according to the process of claim 5.

16. The vulcanizates prepared according to the process of claim 6.

17. The vulcanizates prepared according to the process of claim 7.

18. The process according to claim 4 in which an activating nitrogen-containing accelerator is employed.

19. A rubber vulcanization accelerator material comprising 2-mercapto benzoselenazole.

20. A rubber vulcanization accelerator material comprising a benzoselenazyl 2-sulphide compound.

21. Zinc benzoselenazyl 2-sulphide.

22. The metal salts of the 2-mercapto selenazoles.

23. The selenazyl 2-mono sulphide compounds.

WINFIELD SCOTT.

CERTIFICATE OF CORRECTION.

Patent No. 2,208,333.

July 16, 1940.

WINFIELD SCOTT.

It is hereby certified that error appears in the printed specification of the above numbered patent requiring correction as follows: Page 2, second column, line 36, for "20.95" read --20.95%--; page 3, second column, lines 5 and 6, for "benzosele- is as follows:" read --benzoselenazyl 2-sulphide--; and that the said Letters Patent should be read with this correction therein that the same may conform to the record of the case in the Patent Office.

Signed and sealed this 1st day of October, A. D. 1940.

Henry Van Arsdale,
Acting Commissioner of Patents.

(Seal)